United States Patent
Pottjegort

(10) Patent No.: US 10,817,897 B2
(45) Date of Patent: Oct. 27, 2020

(54) CLIENT-SIDE EVENT MONITORING

(71) Applicant: comScore, Inc., Reston, VA (US)

(72) Inventor: Thomas Pottjegort, Ashburn, VA (US)

(73) Assignee: COMSCORE, INC., Reston, VA (US)

( * ) Notice: Subject to any disclaimer, the term of this patent is extended or adjusted under 35 U.S.C. 154(b) by 297 days.

(21) Appl. No.: 13/768,650

(22) Filed: Feb. 15, 2013

(65) Prior Publication Data

US 2013/0238423 A1 Sep. 12, 2013

Related U.S. Application Data

(60) Provisional application No. 61/608,920, filed on Mar. 9, 2012.

(51) Int. Cl.
*G06Q 30/02* (2012.01)

(52) U.S. Cl.
CPC .................. *G06Q 30/0246* (2013.01)

(58) Field of Classification Search
USPC ............................................ 709/224; 706/47
See application file for complete search history.

(56) References Cited

U.S. PATENT DOCUMENTS

| 8,458,227 | B1 * | 6/2013 | Brundage | G06F 16/9566 707/804 |
| 9,805,377 | B2 | 10/2017 | Pottegort | |
| 2008/0114875 | A1 * | 5/2008 | Anastas et al. | 709/224 |
| 2009/0271514 | A1 | 10/2009 | Thomas et al. | |
| 2012/0054143 | A1 * | 3/2012 | Doig et al. | 706/47 |

OTHER PUBLICATIONS

International Search Report and Written Report dated May 13, 2013 from International Application No. PCT/US2013/029037, pp. 1-12.

* cited by examiner

*Primary Examiner* — Afaf Osman Bilal Ahmed
(74) *Attorney, Agent, or Firm* — BakerHostetler

(57) ABSTRACT

Techniques for client-side event monitoring are presented. The techniques store accumulated visibility and interaction information about online content in local memory on a client device, such as, for example, within a web cookie. The client device then transmits the stored information to a remote server. The techniques do not require that a client device modify a browser by, e.g., installing a plug-in.

30 Claims, 7 Drawing Sheets

CLIENT-SIDE EVENT MONITORING

PRIORITY

The present application claims priority to U.S. Provisional Patent Application No. 61/608,920, entitled "Client-Side Event Monitoring," filed Mar. 9, 2012, which is hereby incorporated by reference herein in its entirety.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their web site. In addition, understanding Internet audience visitation and habits may be useful for informing advertising planning, buying, and selling decisions.

In the area of online advertising, an advertiser, such as a company that is selling goods or services or a non-profit entity advancing a particular cause, pays a website owner, known as a "publisher," to include the advertiser's advertisements into one or more of the publisher's webpages. An advertiser may have its advertisements displayed through multiple publishers or third party advertising networks/brokers, and a publisher may display advertisements from multiple advertisers or third party advertising networks/brokers on any one of its webpages.

FIG. 1 depicts an example of a publisher webpage 120 that includes a plurality of advertisements 131-133. Advertisements 131-133 may comprise image files, Flash™ files, textual elements, or any other kinds of objects or elements that may be used to market products or services. Typically, rather than hosting advertisements 131-133 directly on its server, the publisher will include links or elements (known as "ad-codes") into the hypertext markup language (HTML) of webpage 120. The ad-codes will instruct users' browsers to retrieve advertisements from ad-servers operated by advertisers or from ad-servers operated by third-party intermediaries, such as advertising networks or brokers. FIG. 1 depicts an exemplary webpage 120 as it might be rendered by a web browser 110 on a client device after having retrieved both the HTML of the webpage from the publisher and advertisements 131-133 from their respective advertisers or third party advertising networks.

In an impression- or view-based advertising compensation model, a publisher may earn a commission from an advertiser each time that a webpage containing an advertisement is viewed by a user. Typically, an advertiser or ad-server will track the number of distinct views by simply counting the total number of hypertext transfer protocol (HTTP) requests made by users to download the advertisement from a server operated by the advertiser or third-party ad network that hosts the advertisement file(s). However, one significant drawback to this approach is that even if an advertisement is downloaded by a browser, it may never actually be displayed in a visible area of its parent webpage and, thus, could not actually be viewable by a user.

For example, FIG. 2 depicts publisher webpage 120 in its entirety—that is, representing all of the content encoded in its corresponding HTML file. FIG. 2 also depicts the viewport 112 of browser 110 in the form of a dashed-line box. Viewport 112 may represent the portion of webpage 120 that is being displayed in or otherwise in focus within browser 110 at any given time. By comparing FIGS. 1 and 2, it can be seen that viewport 112 encompasses only a portion of webpage 120, with the rest of the page running outside the visible area of the browser, a phenomenon sometimes referred to as "page-clipping." For example, although advertisements 134 and 135 are also included within webpage 120, these advertisements will not be displayed in viewport 112 unless a user instructs browser 110 to scroll downward.

Moreover, even if an advertisement is contained within the viewport of a browser, there may be other reasons why it may nevertheless not be visible on a client device screen. For example, as depicted in FIG. 3, in some operating systems, the window of browser 110 may be positioned within a graphical user interface (GUI) desktop 300 such that a portion of the window runs off of the visible area of the device screen, a phenomenon sometimes referred to as "screen-clipping." In the example of FIG. 3, even if advertisements 131-133 were within the viewport of browser 110, such advertisements might never be displayed to a user if they were positioned only within a screen-clipped area of the viewport.

Similarly, as depicted in FIG. 4, objects within a webpage might not be visible to a user, even if they are included in the viewport of the browser, if they are positioned within an area of the viewport that is obscured by another window or object. For example, as depicted in FIG. 4, although advertisements 131-133 are within the viewport of browser 110, only advertisement 133 is visible, advertisements 131 and 132 being obscured by another window 400.

An advertisement may not be visible, or fully visible, on a device screen for other reasons, despite having been downloaded by a browser. For example, a webpage may be downloaded and rendered in a separate browser window or tab that the user never brings to the foreground, or an advertisement may be contained within an area of a publisher webpage that has smaller dimensions than the dimension of the advertisement, in which case the advertisement may be only partially displayed.

In any of these and other cases in which an advertisement is downloaded but not displayed, or not fully displayed, on a client device screen, an advertiser or third-party ad network may nevertheless credit the publisher with a view, since, absent manual inspection of the publisher webpage, the advertiser or third-party ad network will know only that the advertisement was downloaded by the user. As a result, advertisers may pay commissions for a significant number of downloaded advertisements that were never actually visible (or could never have been visible) to users. This could result in advertisers being susceptible to fraudulent activity designed to illegitimately increase impression counts without actually displaying the requested advertisements to end-users.

Various techniques have been proposed for determining accurate view-counts for electronic advertisements that do not rely merely on download statistics, but are also able to determine whether electronic advertisements have been displayed in a viewable area of client device screens and how end-users interact with those advertisements. However, once such visibility information has been captured on the client device, it may be necessary to transmit the information to one or more remote metric or collection servers. One technique that may be used to transmit visibility information from the client device to a collection server is for the client device to perform a network interaction with the collection server each time a visibility or interactivity event occurs on the client device.

However, there may be problems associated with such a "real-time" approach. One problem is that this approach may require a large number of transmissions back and forth with a collection server. Accordingly, if one or more of those transmissions fail, then the information contained within those transmissions may be lost, resulting in inaccurate visibility metrics being reported to the collection server. Additionally, these constant transmissions may impact network performance and/or the processing speed of the client device, thereby negatively impacting user experience. Moreover, such a technique may impact the performance of the measurement code by requiring it to constantly make costly network connections.

Such problems may be further exacerbated if the client device is tasked with monitoring multiple pieces of online content such as, for example, when measuring visibility and interactivity information associated with numerous different online advertisements presented on a publisher page. Using a real-time approach, monitoring multiple pieces of online content may result in numerous network interactions being continuously performed for each of the different objects being measured. For example, if a publisher page includes seven different advertisements, each of which is monitored for visibility or interactivity on the client device, real-time monitoring might result in a separate network interaction with a collection server each time a new visibility or interactivity event is detected for any one of the seven advertisements. As the number of monitored objects increases, so may the number of network interactions that must be performed by the client, and, accordingly, the burden on client device processing power and network bandwidth resulting from execution of the monitoring code may also increase. These burdens may therefore significantly impact user experience with the online content, an undesirable outcome.

Thus, online advertising may be improved by techniques that enable the monitoring of visibility or user interaction with numerous pieces of online content on a client device and the reporting of that information to one or more external servers without generating a network interaction for each event associated with each piece of online content. Online advertising may further be improved by techniques that allow visibility and interactivity information to be accumulated and stored locally on the client device using a web browser and to be transmitted in batches to a collection server, without the need for the user to take any action, such as installing a browser plug-in or modify the behavior of a browser in some other way.

SUMMARY

The present disclosure addresses these and other improvements to online advertising. In some embodiments, measurement code may be incorporated into a publisher web page that is downloaded by a client device. The measurement code may include or obtain monitoring code and storage code. The client device may execute the monitoring code to monitor content visibility and user interaction associated with various elements in the publisher web page. The information collected by the monitoring code is accumulated and communicated to storage code associated with the monitoring code. The storage code stores the accumulated visibility and interaction information into local memory on the client device, such as, for example, within a web cookie. Such information may be stored in either persistent or non-persistent memory. The stored information is then transmitted by the client device to a remote server during a subsequent network interaction with the remote server.

The present disclosure provides for the accumulation and storage of information concerning different visibility and interactivity events locally on the client device through mechanisms provided by standard web browsers (such as, for example, within a web cookie) and without the need to install any new software on the client device, such as browser plug-ins. Because the monitoring code stores visibility and interactivity information locally in an aggregated manner instead of initiating a new transmission to a remote server for each distinct event, the present disclosure increases the efficiency of the monitoring code. The present disclosure also provides for transmission of the stored visibility and interactivity information to a collection server in batches using the aggregated information. This feature provides a more robust technique for monitoring, measuring, and reporting visibility and interactivity information by significantly reducing the number of network interactions between the client device and a remote collection server. The present disclosure also improves the efficiency of the collection of visibility and interactivity information, thereby reducing potentially detrimental impacts on end-user experience when interacting with online content.

By providing an improved technique for monitoring and reporting visibility and interactivity information related to online content, the present disclosure also allows multiple pieces of online content to be efficiently monitored and stored locally without burdening the client device with numerous network interactions for each piece of displayed content that is to be monitored.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
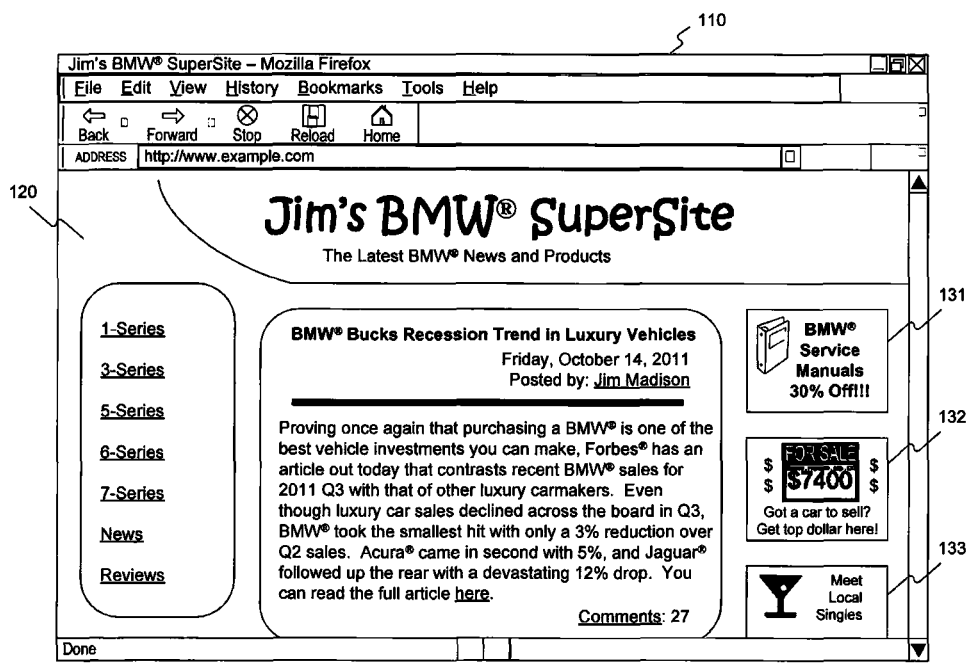
FIG. 1 is a diagram depicting an exemplary publisher webpage that includes third-party advertisements, as rendered by a web browser and displayed on a client device screen.
Figure 2:
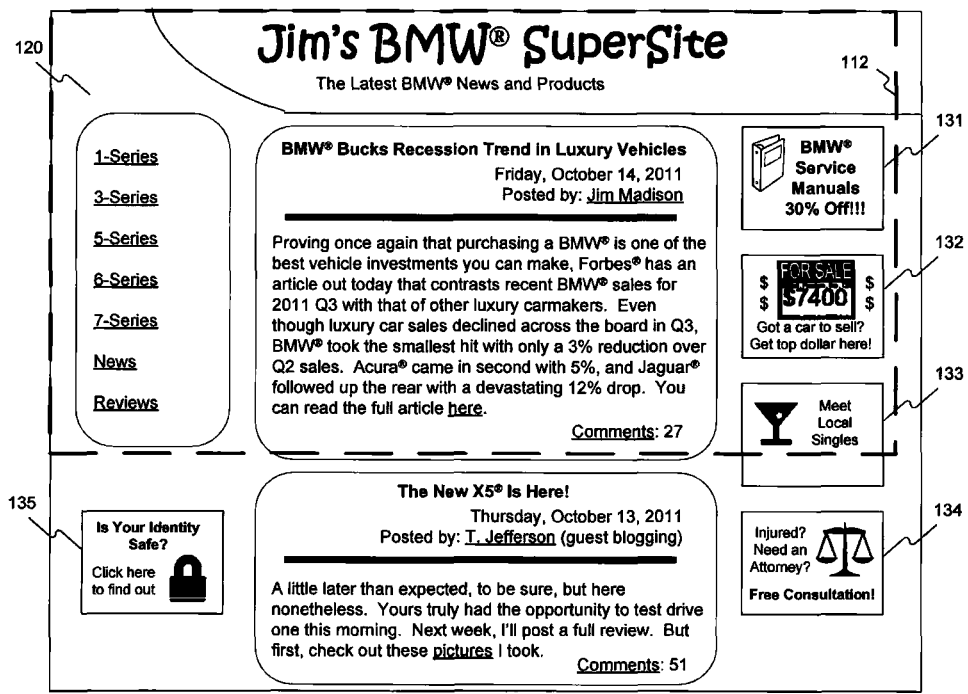
FIG. 2 is a diagram depicting an exemplary comparison between a publisher webpage that includes third-party advertisements and a web browser viewport.
Figure 3:
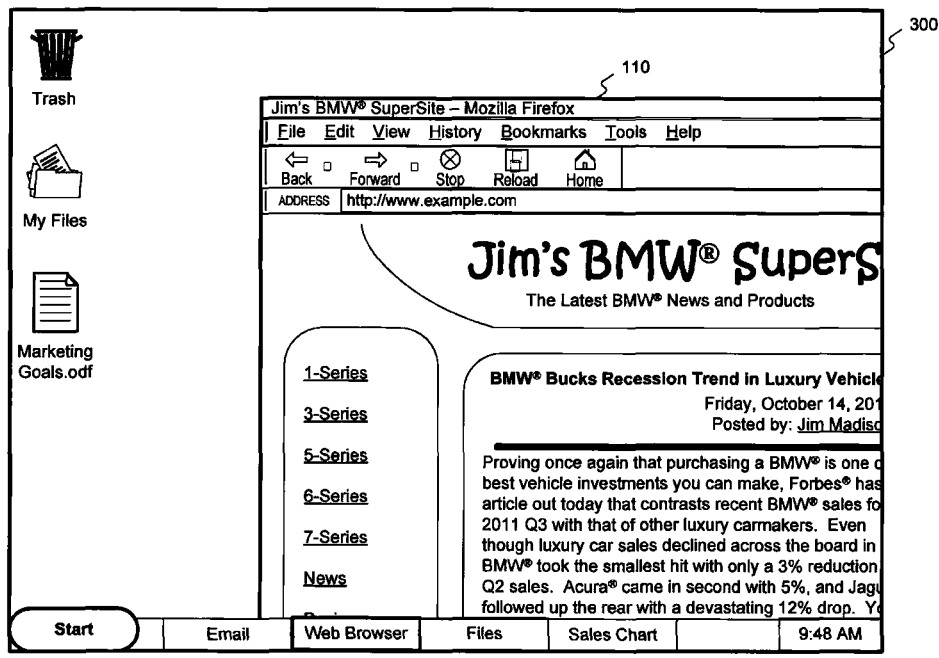
FIG. 3 is a diagram depicting an exemplary screen-clipping occurrence in which a portion of a web browser viewport has been positioned outside of the viewable screen area of a client device.
Figure 4:
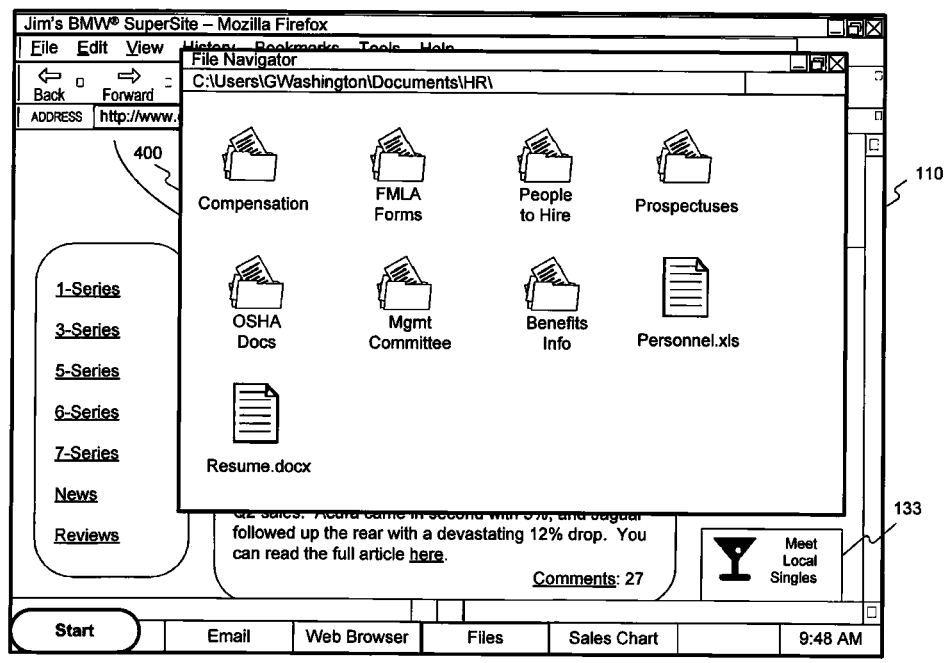
FIG. 4 is a diagram depicting an exemplary window arrangement in which a portion of a web browser viewport has been obscured by another GUI window.
Figure 5:
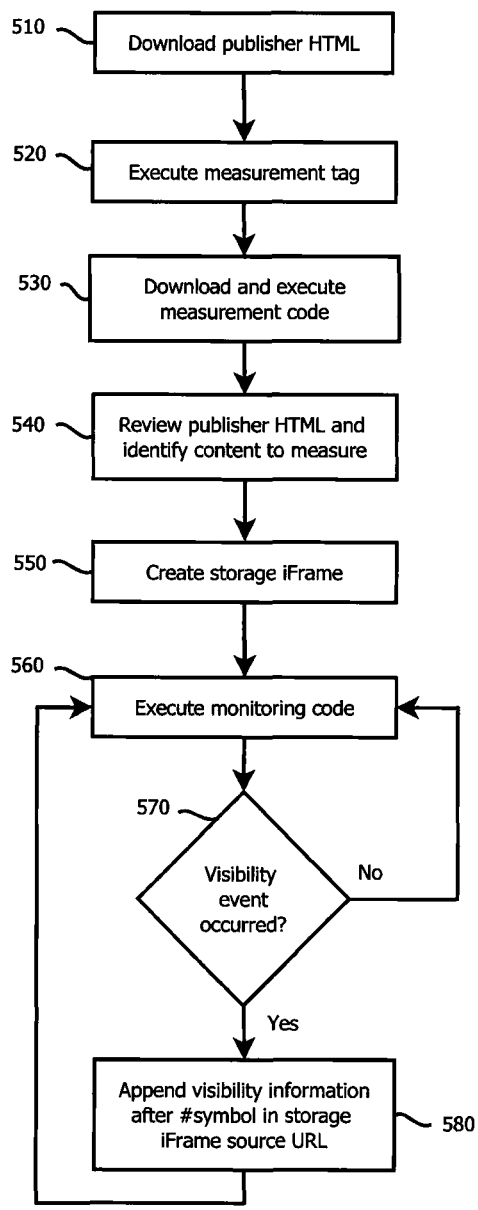
FIG. 5 is a flowchart depicting an exemplary method of monitoring visibility and interactivity events.
Figure 6:
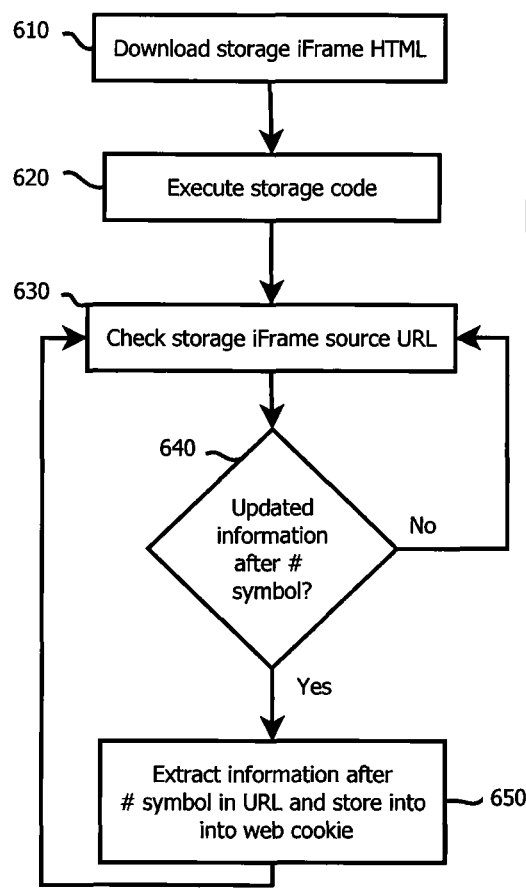
FIG. 6 is a flowchart depicting an exemplary method of storing visibility and interactivity information.

FIGS. 5 and 6 depict exemplary methods for monitoring visibility and interactivity events associated with online content and for storing information related thereto. As depicted in FIG. 5, in one embodiment, measurement code implementing the present disclosure may be downloaded onto the client device as part of a publisher web page to be displayed in a web browser on the client device (step 510). The web page may include a measurement tag that, when executed, directs the client device to download content, in the form of measurement code, from a code delivery server associated with a particular measurement code URL (step 520). Parameters that provide metadata regarding the publisher web page may be encoded within the measurement code URL string such as, for example, as URL parameters after a question mark symbol ("?"). The parameters may include information regarding the web page publisher and/or information identifying an advertisement campaign for measurement. The parameters may also include a unique ID associated with the end-user, user session, or client device. The code delivery server may transmit measurement code to the client device. The server may use the parameters encoded within the measurement code URL to decide what type of measurement code to deliver to the client device. The capability of the measurement code can vary based on the passed-in metadata. For example, the code delivery server may decide to transmit measurement code that measures one or both of the visibility of online content (such as advertisements) and user interaction with that content. The custom measurement code can be in a variety of different programming languages, such as JavaScript.

Once the measurement code is downloaded and executed on the client device by the web browser (step 530), the measurement code may examine the contents of the web page downloaded by the client device to identify content to be monitored (step 540). In one embodiment, the objects to be monitored may be tagged in a manner that indicates that they are to be monitored. For example, each object to be monitored may include a placement ID uniquely identifying the object for the monitoring code.

In one embodiment, the measurement code may create a "storage code" iFrame object to be inserted into the web page (step 550). The source URL for the storage code iFrame object may be a specified storage code URL. In one embodiment, the storage code URL may point to or otherwise be associated with the code delivery server. In another embodiment, the storage code URL may point to or otherwise be associated with a third party server. The storage code URL may encode placement information for the monitored objects, for example as URL parameters after a question mark symbol ("?"). The server associated with the storage code URL may transmit storage code to the client device for insertion into the storage code iFrame object. Upon execution, the storage code may enable the storage of visibility and interactivity information into local storage on the client device, such as within a web cookie. The storage code may also store additional information, such as the unique ID associated with the end-user or user session. A further description of the storage code is provided below.

In some embodiments, the measurement code may include monitoring code that, when executed, monitors and accumulates information regarding the visibility of web content and/or user interactivity with web content in the browser or on the client device (step 560). The monitoring code can use a variety of techniques to capture visibility metrics or interactivity events associated with content. For example, the monitoring code may use or modify one or more of the techniques for measuring content visibility that are described in U.S. patent application Ser. No. 13/352,134, which is hereby incorporated by reference in its entirety. However, other techniques may be used to measure visibility and/or interactivity information in accordance with the present disclosure. When the monitoring code detects a visibility or interactivity event associated with the monitored web page content (step 570, "Yes"), the monitoring code may communicate information associated with the event to the storage code for storage into local memory.

In one embodiment, the monitoring code may communicate visibility and interactivity information to the storage code through the source URL of the storage code iFrame object. Because the measurement code generated the storage code iFrame object, the measurement code will have access to properties of the object, including the object's source URL property. Accordingly, the monitoring code may communicate the visibility and interactivity information through URL parameters, such as name-value pairs, encoded within or appended to the source URL property of the storage code iFrame object. In one embodiment, the storage code iFrame's source URL may include a hash symbol ("#") at the end of its URL string, and the monitoring code may communicate visibility and/or interactivity information as name-value pairs appended after the hash symbol, thereby modifying the URL property without triggering another network request to the URL (step 580). Other techniques may also be used to communicate visibility and/or interactivity information to the storage code iFrame object.

FIG. 6 presents a flowchart depicting the process flow of one embodiment of the storage code iFrame and storage code of the present invention. After the measurement code creates the storage code iFrame object, the storage code iFrame's HTML may be downloaded onto the client device (step 610). The storage code iFrame may include storage code, or may include instructions to download storage code. Once the storage code is executed (step 620), the code may periodically review the source URL string for the storage code iFrame object to detect if any new or additional visibility or interactivity information has been added to the URL string. For example, the storage code may analyze the source URL to determine whether any of the information after the hash symbol has changed since the source URL was last analyzed (step 630).

Upon initial execution, there may be no information appended after the hash symbol of the storage code URL string. However, once the monitoring code detects visibility or interactivity events, it may change the text of the storage code URL string to encode name-value pairs describing the events, for example by appending name-value pairs to the storage code URL after the hash symbol, as described with respect to step 580 of FIG. 5. The monitoring code may update the name-value pairs appended after the hash symbol of the storage code URL as additional events are detected, thereby accumulating information regarding a plurality of events on a web page within the name-value pairs. If the storage code detects that the visibility and interactivity information after the hash symbol of the storage code URL string has changed (step 640, "Yes"), the storage code may extract the new or updated information from the name-value pairs and store it in local storage on the client device, such as within a web cookie (step 650).

Figure 7:
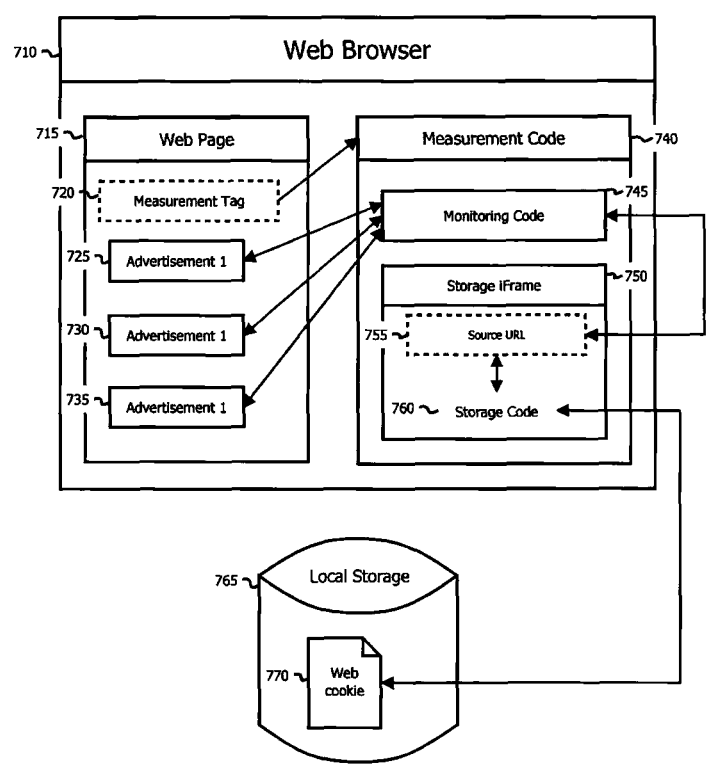
FIG. 7 is a diagram depicting an exemplary arrangement of client-executable code for monitoring visibility and interactivity events and storing event information locally.

FIG. 7 depicts one exemplary embodiment of the present invention consistent with the above description. As described, web browser 710 may include a web page 715 that includes a measurement tag 720 and also a series of objects to be measured, such as online advertisements 725-735. The execution of the measurement tag may result in measurement code 740 being downloaded and executed by the web browser. Measurement code 740 may include monitoring code 745 and storage iFrame 750. Storage iFrame may include a source URL property 755 and storage code 760 for storing visibility and interactivity information within a web cookie 770 stored in local storage 765.

In one embodiment, the storage code may regularly check the name-value pairs appended after the hash symbol in the storage code iFrame's source URL to determine if the visibility and interactivity information has changed. For example, the storage code may check the source URL every 100 ms, or after some other specified period of time has elapsed. If the information after the hash symbol ("#") has changed, the storage code may store the visibility and interactivity information provided by the name-value pairs (or the new name-value pairs) into storage on the client device. Such storage may be persistent or non-persistent (e.g., session-based) in nature. The storage code may also store the unique ID along with the visibility and interactivity information.

In another embodiment, the storage code may wait until an event occurs before it analyzes the storage code iFrame's source URL property to determine whether the visibility and interactivity information encoded therein has changed. For example, the storage code may only perform this check when a frame "resin" event occurs in relation to the storage code iFrame.

In one embodiment, the storage code may store the visibility and interactivity information within a client-side web cookie. The cookie may include a domain name property associated with a collection server (e.g., a collection server affiliated with the source URL of the storage code iFrame), such that the cookie (and, thus the visibility and interactivity information) is transmitted to the collection server when the client device makes a subsequent HTTP request to a server within the domain of the cookie. The collection server may reset the cookie after it receives the visibility and interactivity information.

In another embodiment, the storage code may transmit the cookie to the collection server in a "heartbeat" fashion. For example, the storage code may repeatedly make a request to a server within the cookie domain after a specified period of time (such as, for example, every second). Accordingly, the visibility and interactivity information is accumulated and stored locally on the client device and then subsequently transmitted to a collection server in one batch.

The web cookie may contain accumulated visibility and interactivity information for a plurality of objects on one publisher page. However, a web browser may display multiple pages within different tabs of the browser's user interface. Additionally, the web browser may display multiple web pages in different browser windows open simultaneously. Accordingly, the web cookie may also contain visibility and interactivity information for multiple web pages open at one time. The stored information for different web pages may be separated into records based on a unique ID associated with each page. The storage code for each web page may use the unique web page ID to locate and update previously stored visibility and interactivity information for that web page. In order to prevent synchronization and file-access issues associated with multiple accesses by storage code executing for simultaneously open web pages, the storage code may randomize the delay between accesses to the web cookie.

Although the above discussion describes the storage of visibility and interactivity information within a web cookie, the present disclosure is not so limited. Other forms of local data storage may be used to store the visibility and interactivity information. For example, the storage code may store the visibility and interactivity information locally on the client device within a HTML5 local database object. Information from local database may then be transmitted to the collection server in a subsequent network interaction with the server. In other examples, the storage code may store the visibility and interactivity information within a Flash cookie object, a JavaScript data structure, or other local objects supported by web browser extensions such as Silverlight or Java objects.

Likewise, other techniques, apart from cookies, may be used to transmit visibility and interactivity information to a collection server. For example, such information may be encoded within URLs that are used to make HTTP requests to the collection server, or to header or payload data within the HTTP request object. In some embodiments, the storage code may transmit visibility and interactivity information to the collection server by initiating an asynchronous eXtensible Markup Language (XML) HTTP request, or by sending an HTTP request for an image (such as a transparent 1×1 pixel image) to the collection server.

The disclosed embodiments are also not limited to advertisements, but may be used in any situation in which it is desirable to determine the visibility of content, such as an image, on a device screen or application window or to determine user interaction with such content, whether in connection with a mobile application, a web browser, or a different application that is running locally on a client device. Moreover, although described in the context of HTTP communications, the invention is not limited to any particular open systems interconnection (OSI) layer; rather, any suitable application, presentation, session transport, network, data link, or physical protocol may be used, whether as part of the OSI model or as a standalone protocol.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention.

Likewise, the steps described need not be performed in the same sequence discussed or with the same degree of separation. Various steps may be omitted, repeated, combined, or divided, as necessary to achieve the same or similar objectives or enhancements. Accordingly, the invention is not limited to the above-described embodiments, but instead is defined by the appended claims in light of their full scope of equivalents.

Certain embodiments can be implemented as or using a computer program or set of programs. The computer programs can exist in a variety of forms both active and inactive. For example, the computer programs can exist as software program(s) comprised of program instructions in source code, object code, scripts, executable code or other formats, firmware program(s), or hardware description language (HDL) files. Any of the above can be embodied on a non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Certain embodiments can utilize or include a computer system, which may include one or more processors coupled to random access memory operating under control of or in conjunction with an operating system. The processors may be included in one or more servers, clusters, or other computers or hardware resources, or may be implemented using cloud-based resources. The processors may communicate with persistent memory, which may include a hard drive or drive array, to access or store program instructions or other data. The processors may be programmed or configured to execute computer-implemented instructions to perform the techniques disclosed herein.

What is claimed is:

1. A computer implemented method, comprising:
   downloading a webpage including a measurement tag and a plurality of pieces of online content to be measured, wherein the measurement tag specifies a Uniform Resource Locator (URL);
   generating a request based on the URL to determine, from among a plurality of different types of measurement code, one of the different types of measurement code;
   receiving the one measurement code that includes monitoring code to monitor (i) user interaction, (ii) visibility, or (iii) both user interaction and visibility and instructions to generate storage code, wherein the storage code is separate from the one measurement code;
   executing the one measurement code on a client device to generate the storage code based on the instructions included in the one measurement code; and
   executing the monitoring code to monitor user interaction with, content visibility of, or both user interaction with and content visibility of the plurality of pieces of online content to be measured thereby generating content information; and
   executing the storage code to:
      create an iFrame object inserted in the webpage to access and store the content information;
      generate a cookie (i) to accumulate the content information by encoding or appending one or more parameters thereof to a source URL of the iFrame object and (ii) to store the accumulated content information locally on the client device, wherein the cookie is different from the iFrame object; and
      forward the stored accumulated content information to a collection server affiliated with a domain of the cookie.

2. The method of claim 1, wherein the content information further includes information regarding visibility of each of the plurality of pieces of online content to be measured.

3. The method of claim 1, wherein each of the one or more parameters comprises a name-value pair, and
   wherein the accumulation causes the source URL of the iFrame object to be updated without triggering a network request to the source URL.

4. The method of claim 1, wherein the storage code extracts the content information by accessing a source URL property of the iFrame object to obtain the content information.

5. The method of claim 1, wherein the content information further contains content information from a plurality of different webpages open at one time, each of the different webpages having a different domain.

6. The method of claim 1, wherein the cookie stores additional accumulated content information locally on the client device in response to local events.

7. The method of claim 1, wherein forwarding the stored accumulated content information is in response to the client device making a Hyper Text Transfer Protocol (HTTP) request to the collection server within the domain of the cookie.

8. The method of claim 1, wherein forwarding the stored accumulated content information is performed periodically to the collection server.

9. A computer implemented method, comprising:
   receiving, by one or more electronic processors, a request to a Uniform Resource Locator (URL), wherein the request is based on the URL to determine, from among a plurality of different types of measurement code, one of the different types of measurement code;
   providing, by the one or more electronic processors, the one measurement code specified in a measurement tag included in a webpage that includes a plurality of pieces of online content to be measured, wherein the one measurement code includes monitoring code to monitor (i) user interaction, (ii) visibility, or (iii) both user interaction and visibility and instructions to generate storage code, wherein the storage code is separate from the one measurement code;
   wherein the one measurement code executes on a client device to generate the storage code on the client device based on the instructions included in the one measurement code;
   wherein the monitoring code, in response to execution of the one measurement code, executes on the client device to monitor user interaction with, content visibility of, or both user interaction with and content visibility of the plurality of pieces of online content to be measured thereby generating content information; and
   wherein the storage code executes on the client device to:
      create an iFrame object inserted in the webpage to access and store the content information;
      generate a cookie (i) to accumulate the content information by encoding or appending one or more parameters thereof to a source URL of the iFrame object and (ii) to store the accumulated content information locally on the client device, wherein the cookie is different from the iFrame object; and
      forward the stored accumulated content information to a collection server affiliated with a domain of the cookie.

10. The method of claim 9, wherein the content information further includes information regarding visibility of each of the plurality of pieces of online content to be measured.

11. The method of claim 9, wherein each of the one or more parameters comprises a name-value pair, and
    wherein the accumulation causes the source URL of the iFrame object to be updated without triggering a network request to the source URL.

12. The method of claim 9, wherein the storage code executes on the client device to extract the content information by accessing a source URL property of the iFrame object to obtain the content information.

13. The method of claim 9, wherein the content information further contains content information from a plurality of different webpages open at one time, each of the different webpages having a different domain.

14. The method of claim 9, wherein the storage code executes on the client device to store additional accumulated content information in the cookie locally on the client device in response to local events.

15. The method of claim 9, wherein the storage code executes on the client device to forward the stored accumulated content information in response to a Hyper Text Transfer Protocol (HTTP) request to the collection server within the domain of the cookie.

16. The method of claim 9, wherein the storage code executes on the client device to forward the stored accumulated content information periodically.

17. A computer implemented method, comprising:
providing, by an electronic processor, a webpage, wherein the webpage includes a measurement tag and plurality of pieces of online content to be measured, wherein the measurement tag specifies a Uniform Resource Locator (URL);
wherein the measurement tag causes a client device to generate a request based on the URL to determine, from among a plurality of different types of measurement code, one of the different types of measurement code;
wherein the one measurement code includes monitoring code to monitor (i) user interaction, (ii) visibility, or (iii) both user interaction and visibility and instructions to generate storage code, wherein the storage code is separate from the one measurement code;
wherein the one measurement code executes on the client device to generate the storage code on the client device based on the instructions included in the one measurement code;
wherein the monitoring code, in response to execution of the one measurement code, executes on the client device to monitor user interaction with, content visibility of, or both user interaction with and content visibility of the plurality of pieces of online content to be measured thereby generating content information; and
wherein the storage code executes on the client device to:
create an iFrame object inserted in the webpage to access and store the content information;
generate a cookie (i) to accumulate the content information by encoding or appending one or more parameters thereof to a source URL of the iFrame object and (ii) to store the accumulated content information locally on the client device, wherein the cookie is different from the iFrame object; and
forward the stored accumulated content information to a collection server affiliated with a domain of the cookie.

18. The method of claim 17, wherein the content information further includes information regarding visibility of each of the plurality of pieces of online content to be measured.

19. The method of claim 17, wherein each of the one or more parameters comprises a name-value pair, and wherein the accumulation causes the source URL of the iFrame object to be updated without triggering a network request to the source URL.

20. The method of claim 17, wherein the storage code executes on the client device to extract the content information by accessing a source URL property of the iFrame object to obtain the content information.

21. The method of claim 17, wherein the content information further contains content information from a plurality of different webpages open at one time, each of the different webpages having a different domain.

22. The method of claim 21, wherein the storage code executes on the client device to store additional accumulated content information in the cookie locally on the client device in response to local events.

23. The method of claim 17, wherein the storage code executes on the client device to forward the stored accumulated content information in response to a Hyper Text Transfer Protocol (HTTP) request to the collection server within the domain of the cookie.

24. The method of claim 17, wherein the storage code executes on the client device to forward the stored accumulated content information periodically.

25. The method of claim 1, wherein each of the plurality of pieces of online content to be measured include a placement ID uniquely identifying the online content for the monitoring code.

26. The method of claim 9, wherein each of the plurality of pieces of online content to be measured include a placement ID uniquely identifying the online content for the monitoring code.

27. The method of claim 17, wherein each of the plurality of pieces of online content to be measured include a placement ID uniquely identifying the online content for the monitoring code.

28. The method of claim 1, wherein one or more other parameters are encoded in the specified URL after a special character within a string that includes the specified URL.

29. The method of claim 1, further comprising:
detecting visibility and/or user interaction information encoded in a URL string.

30. The method of claim 1, further comprising:
encoding visibility and/or user interaction information into a URL string.

* * * * *